US007739664B2

(12) United States Patent
Bates et al.

(10) Patent No.: US 7,739,664 B2
(45) Date of Patent: Jun. 15, 2010

(54) COLLECTION AND DETECTION OF DIFFERENCES OF VALUES OF EXPRESSIONS/VARIABLES WHEN DEBUGGING A COMPUTER PROCESS

(75) Inventors: Cary Lee Bates, Rochester, MN (US); Vadim Berestetsky, North York (CA); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1084 days.

(21) Appl. No.: 10/462,534

(22) Filed: Jun. 16, 2003

(65) Prior Publication Data

US 2004/0078784 A1 Apr. 22, 2004

(30) Foreign Application Priority Data

Oct. 17, 2002 (CA) .................................. 2408457

(51) Int. Cl.
*G06F 9/44* (2006.01)
(52) U.S. Cl. ....................... 717/127; 717/129; 717/131
(58) Field of Classification Search .................. 717/129
See application file for complete search history.

(56) References Cited

U.S. PATENT DOCUMENTS

| 5,148,379 A | 9/1992 | Konno et al. |
| 5,291,497 A | 3/1994 | Ulrich et al. |
| 5,854,925 A | 12/1998 | Shimomura |
| 6,256,777 B1 | 7/2001 | Ackerman |
| 6,378,125 B1 * | 4/2002 | Bates et al. ................. 717/129 |
| 6,401,220 B1 * | 6/2002 | Grey et al. ..................... 714/33 |

(Continued)

FOREIGN PATENT DOCUMENTS

JP 8212105 A 8/1996

(Continued)

OTHER PUBLICATIONS

"Scan-chain based watch-points for efficient run-time debugging and verification of FPGA designs", Tiwari et al., Jan. 2003, pp. 705-711, <http://delivery.acm.org/10.1145/1120000/1119930/p705-tiwari.pdf>.*

(Continued)

*Primary Examiner*—Tuan Q Dam
*Assistant Examiner*—Thuy Dao
(74) *Attorney, Agent, or Firm*—DeLizio Gilliam, PLLC

(57) ABSTRACT

An automated way to detect differences in the values of program variables/expressions and the order of execution between one run and another. A collection mode saves the values of expressions/variables at collection points in the program. On a subsequent execution during the detection mode, these saved values of the same expressions/variables are recalled and compared with the current values. Advantageously, the user selects the collection points within the program at which variable information can be gathered and compared; and these collection points may include: breakpoints set by a debugging program or by the user; collection points set by the user, and entry and/or exit points and/or points within program structures, such as procedure calls, control blocks, etc. Setup of the collection mode includes the capability to modify the expressions/variables, the tolerance or the acceptable alternatives, and the position and number of collection points.

22 Claims, 11 Drawing Sheets

U.S. PATENT DOCUMENTS

| | | | |
|---|---|---|---|
| 6,513,154 B1 * | 1/2003 | Porterfield | 717/101 |
| 6,678,884 B1 * | 1/2004 | Kesselman et al. | 717/129 |
| 6,848,097 B1 * | 1/2005 | Alverson et al. | 717/124 |
| 6,851,075 B2 * | 2/2005 | Ur et al. | 714/36 |
| 7,013,457 B2 * | 3/2006 | Chiang et al. | 717/131 |
| 7,127,593 B2 * | 10/2006 | Wilson | 712/226 |
| 2003/0106045 A1 * | 6/2003 | Arnold et al. | 717/129 |
| 2004/0205720 A1 * | 10/2004 | Hundt | 717/124 |

FOREIGN PATENT DOCUMENTS

| | | |
|---|---|---|
| JP | 2000181700 A | 6/2000 |
| WO | WO0041078 | 7/2000 |
| WO | WO 0041708 A1 | 7/2000 |

OTHER PUBLICATIONS

"Class analyses as abstract interpretations of trace semantics", Spoto et al., Sep. 2003, pp. 578-630, <http://delivery.acm.org/10.1145/940000/937565/p578-spoto.pdf>.*

"Debugging with reverse watchpoint", Maruyama et al., Nov. 2003, pp. 116-123, <http://ieeexplore.ieee.org/stamp/stamp.jsp?tp=&arnumber=1319093&isnumber=29226>.*

Springer, Principles and Practice of Constraint Programming—CP2000, 6th International Conference, Singapore, Sep. 18-21, 2000 Proceedings, "Extending Forward Checking", F. Bacchus, pp. 35-51.

NASA/CP-2000-210100, Lfm2000: Fifth NASA Langley Formal Methods Workshop, Williamburg, VA Jun. 13-15, 2000, Modeling and Verification of Real-Times Software Using Extended Linear Hybrid Automata, S. Vestal.

ACM, ICSE 2000, Proceedings of the 2000 International Conference on Software Engineering, Jun. 4-11, 2000, Limerick, Ireland, "Quickly Detecting Relevant Program Invariants", M.D. Ernst et al, pp. 449-458.

* cited by examiner

COLLECTION POINT TABLE

| STATMENT | TYPE | VARIABLE RANGE |
|---|---|---|
| 52 | BREAKPOINT | A, B |
| 95 | COLLECTION POINT | A, B, C |
| 111 | CONTROL BLOCK ENTRY POINT | A, B |
| 132 | CONTROL BLOCK EXIT POINT | A, B |
| | | |
| | | |

FIGURE 8a

RUN DATA

| STATMENT | TYPE | VARIABLE RANGE | VARIABLE LIST / VALUE |
|---|---|---|---|
| 52 | BREAKPOINT | A, B | A/1, B/23 |
| 95 | COLLECTION POINT | A, B, C | A/1, B/25, C/(STRING) |
| 111 | CONTROL BLOCK ENTRY POINT | A, B | A/5, B/93, C/(DIFFERENT STRING) |
| 132 | CONTROL BLOCK EXIT POINT | A, B | A/1, B/58, C/(STILL DIFFERENT STRING) |

FIGURE 8b

COLLECTION AND DETECTION OF DIFFERENCES OF VALUES OF EXPRESSIONS/VARIABLES WHEN DEBUGGING A COMPUTER PROCESS

TECHNICAL FIELD

This invention relates generally to the field of computer programs, and more particularly, relates to an algorithm which collects the values of expressions/variables of a computer process undergoing debugging and is capable of comparing the values and the order of execution between several execution of the process.

BACKGROUND OF THE INVENTION

An important aspect of the design and development of a computer program is debugging. Debugging is intended to locate and identify errors in a computer program under development. Typically, a programmer uses another computer program commonly known as a "debugger" to debug a program under development. Conventional debuggers typically support two primary operations to assist a computer programmer. A first operation supported by conventional debuggers is a "step" function which permits a computer programmer to process instructions, also known as "statements", one at a time in a computer program and see the results of each instruction upon completion. While the step operation provides a programmer with a large amount of information about a program during its execution, stepping through hundreds or thousands of lines of program instructions is tedious and time consuming. The programmer may be required to step through many program instructions that are already known to be error-free before coming to the instructions that are problematic.

To address this difficulty, a second operation supported by conventional debuggers is a breakpoint operation, which permits a computer programmer to identify a breakpoint. A breakpoint is a precise instruction at which execution of a computer program is halted. As a computer program is executed by a debugger, the program executes in a normal fashion until a breakpoint is reached, at which time the program stops execution and displays the results of the computer program to the programmer for analysis.

Step operations and breakpoints are typically used together to simplify the debugging process. Specifically, a user during a common debugging operation will set a breakpoint at the beginning of a desired set of instructions to be analyzed, and then begin execution of the program undergoing debugging. Execution halts at a breakpoint and the programmer then steps through the desired set of instructions line-by-line using the step operation. Consequently, a programmer is able to quickly isolate and analyze a particular set of instructions without having to step through irrelevant portions of a computer program.

Most breakpoints supported by conventional debuggers are unconditional meaning that once such a breakpoint is reached, execution of the program is always halted. Some debuggers, however, also support the use of conditional breakpoints, which only halt execution of a program when a variable used by the program is set to a predetermined value at the time such a breakpoint is reached. One significant drawback to conventional breakpoints results from the fact that some instructions in a computer program are executed fairly often for different purposes, and may result in needless stoppages before a desired stoppage is encountered. This problem is especially pronounced in object-oriented programming (OOP) and other highly modular languages where a single general purpose portion of a computer program may be executed in a number of different situations for different purposes.

With an object-oriented programming language, for example, a program is constructed from a number of "objects," each of which includes data and/or one or more sets of instructions, often referred to as routines or methods that define specific operations that can be performed on the data. A large number of objects may be used to build a computer program with each object interacting with other objects in the computer program to perform desired operations. When one object invokes a particular routine in another object, the former object is often said to be calling the routine in the latter object. Some general purpose objects in a computer program may support basic operations, e.g., displaying information to a user, printing information on a printer, storing or retrieving information from a database, etc. Particularly, these generic type of objects are called by many different objects so that placing a conventional breakpoint in a routine of one of these common generic objects will result in hundreds of unwanted stoppages prior to occurrence of a desired stoppage. Thus, context sensitive breakpoints can be set in certain debuggers to retrieve the sequence of routines in the computer program that are called just prior to reaching the breakpoint, such as in U.S. Pat. No. 6,077,312 entitled "Apparatus, Program Product and Method of Debugging Utilizing a Context Sensitive Breakpoint" issued 20 Jun. 2000, commonly owned by the assignee and herein incorporated by reference in its entirety. Context sensitive breakpoints locate the specific calls in other objects that relate to the desired stoppage in a particular object. This eliminates the extremely time consuming and tedious task of setting each breakpoint and eliminates the risk that not all relevant calls are located so not all desired circumstances for inducing stoppages may be recognized during debugging.

But, setting breakpoints and halting execution of a program undergoing debugging is still onerous. Significant time is spent going through the breakpoints, whether the breakpoints are general or are context specific, as above. Merely watching breakpoints, moreover, does not solve the problem of determining the dynamics of an executing program in which variables and other expressions stored in a memory location may constantly change. These changing variables, moreover, may have either a direct or an indirect impact on other variables and other computer expressions.

Today when people debug programs, they often have a particular problem in mind. There may also be scenarios where the previous version of the program or a similar run of the same version of the program did not replicate the problem, or illustrates a different problem. In these cases, the user often examines two or more executions of the program and attempts to determine what exactly is different between the several executions. A user can use an iterative approach wherein she/he executes one scenario and then runs a different scenario, trying to detect differences in the values of expressions/variables and/or differences in the order of execution.

There is thus a need in the industry to help programmers understand where a particular expression changes from an expected value during debugging a program. A significant need continues to exist for an improved manner of debugging computer programs, specifically in the area of identifying specific variables at specific locations, called collection points, in the code undergoing debugging, and being able to compare the values of these variables during subsequent executions.

SUMMARY OF THE INVENTION

These needs and others that will become apparent to one skilled in the art are satisfied by an algorithm, a program product, and a method of establishing collection points throughout a program to be debugged or evaluated. At these collection points, which might also include line breakpoints and/or entry, exit, and/or intermittent points of a program structure, or other points of interest set by the user, the values of expressions are collected. These values are compared with the values of the same expressions at the same collection points during a previous run. If the values differ significantly enough from run to run and/or order of execution significantly changes, it may indicate a bug. Either case, the user is notified. Capabilities are given the user to modify the collection points and the expressions to be collected.

BRIEF DESCRIPTION OF THE DRAWING

The novel features believed characteristic of the invention are set forth in the claims. The invention itself, however, as well as a preferred mode of use, objects and advantages thereof, will best be understood by reference to the following detailed description of an illustrative embodiment when read in conjunction with the accompanying Drawing, wherein:

FIGS. 8a and 8b are representations of memory storing the names of, the locations of, the expected and acceptable alternative values of, and the actual values of expressions/variables according to aspects of the invention.

DETAILED DESCRIPTION OF THE INVENTION

Figure 1:
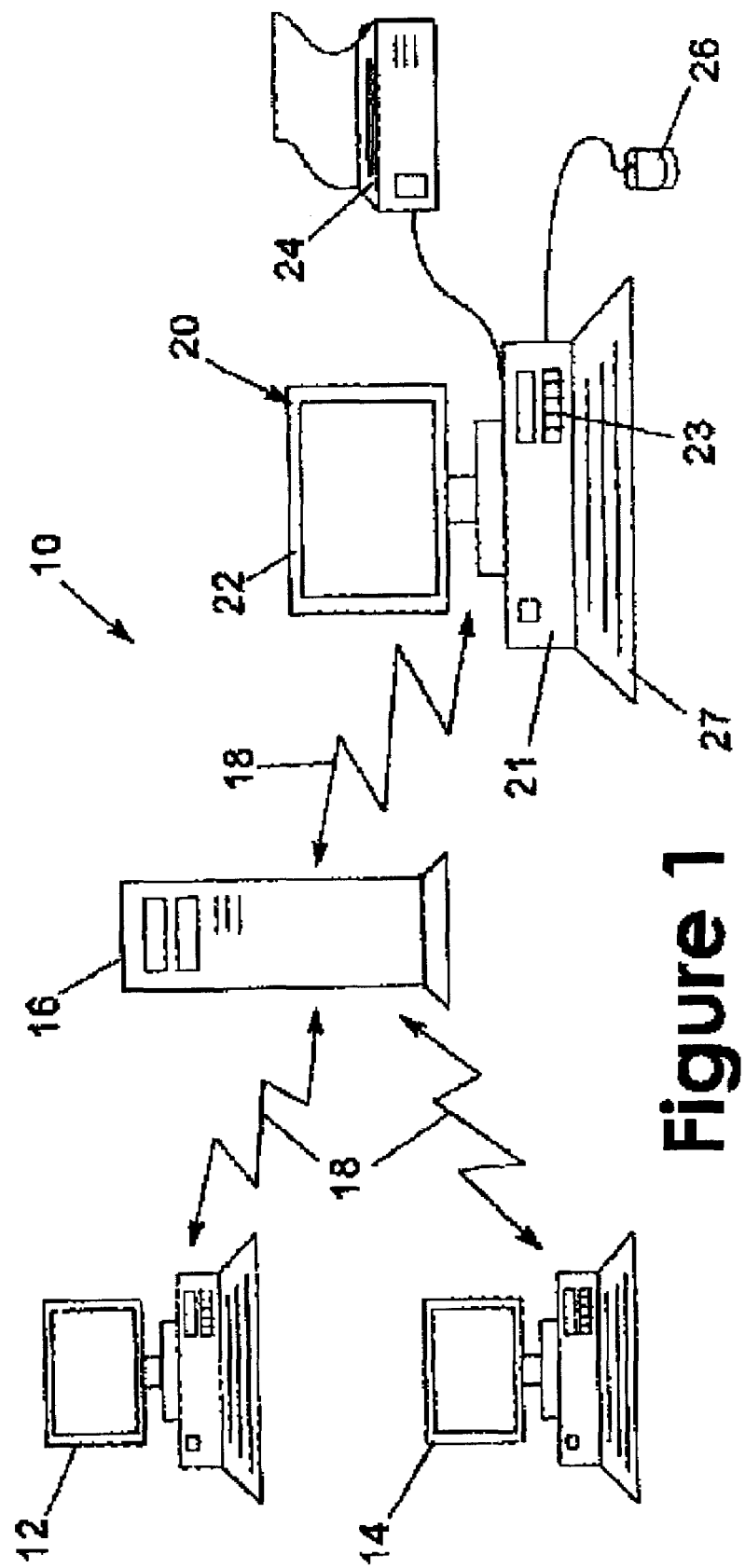
FIG. 1 is a high-level block diagram of a server computer system capable of implementing the preferred embodiment of the invention.

Referring to the drawings, FIG. 1 illustrates an exemplary computer system 10 consistent with the invention. Computer system 10 is illustrated as a networked computer system that includes one or more client computers 12, 14 and 20 such as desktop computers workstations coupled through a network 18 to a server 16. Server 16 could also be a personal computer-based server, a minicomputer, a midrange computer, or a mainframe computer. Network 18 may represent practically any type of networked interconnection including but not limited to local-area, wide-area, wireless, and public networks such as the Internet, and any number of routers connected in between, e.g., a local-area network to a wide-area network to the Internet through a series of routers and/or other servers. Any number of computers and other devices may be networked through network 18, e.g, multiple servers, hand-held devices, etc.

Figure 2:
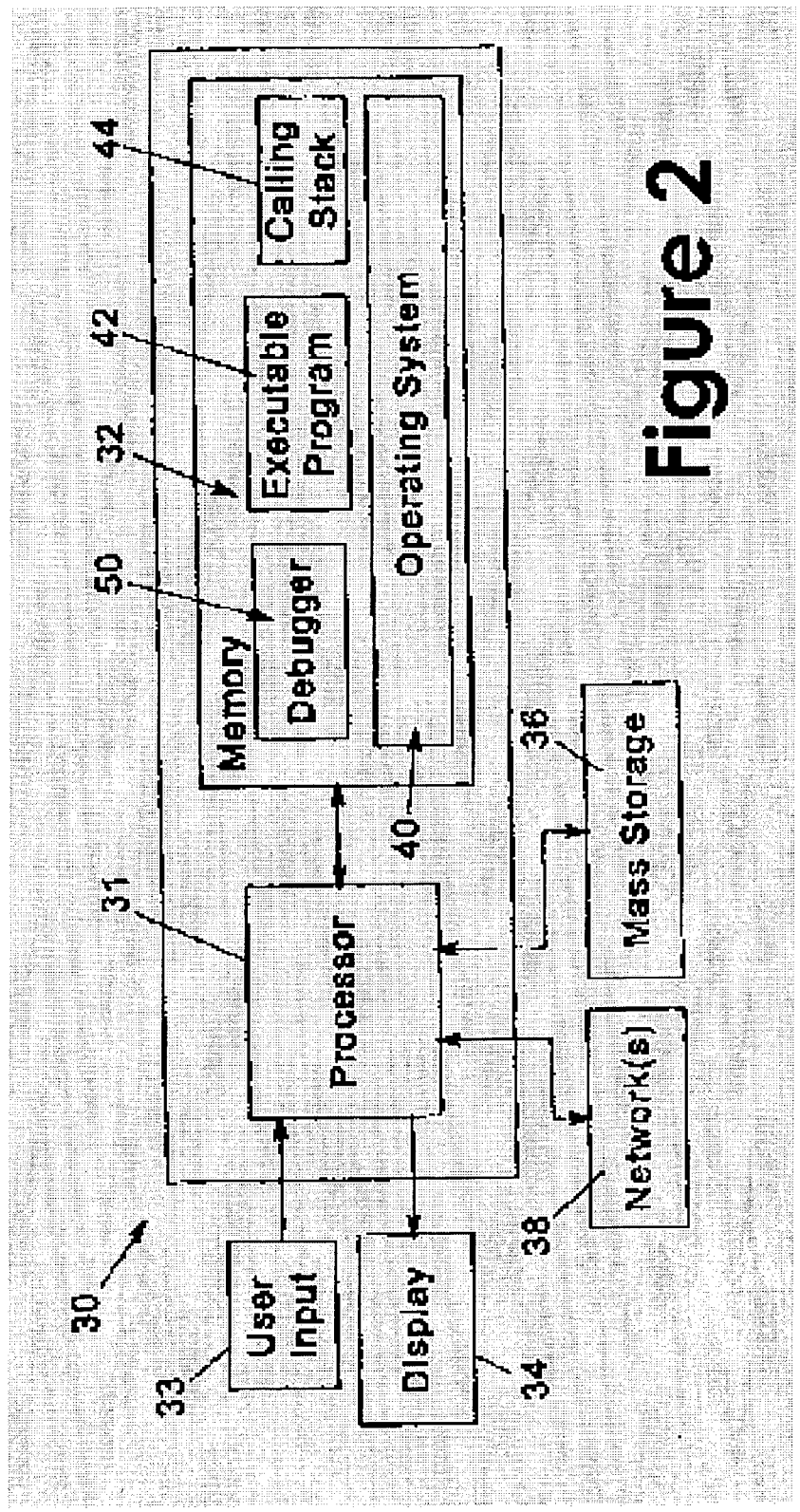
FIG. 2 is a simplified representation of a computer network capable of implementing the preferred embodiment of the invention.

FIG. 2 illustrates another exemplary hardware and software environment for an apparatus 30 consistent with the invention. For the purposes of the invention, apparatus 30 may represent practically any type of computer, computer system, or other programmable electronic device, including a client computer similar to computers 12, 14 and 20 of FIG. 1, a server computer, e.g, similar to server 16 of FIG. 1, a portable computer, an embedded controller, a hand-held device, etc. Apparatus 30 may be coupled in a network as shown in FIG. 1 or may be a stand-alone device. Apparatus 30 will hereinafter also be referred to as a computer although it should be appreciated that the term "apparatus" may also include other suitable programmable electronic devices consistent with the invention.

Computer 30 typically includes at least one processor 31 coupled to a memory 32. Processor 31 may represent one or more processors or microprocessors and memory 32 may represent the random access memory (RAM) devices comprising the main storage of computer 30, as well as any supplemental levels of memory such as cache memories, nonvolatile or backup memories, programmable or flash memories, read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 36 or on another computer coupled to computer 30 via network 38.

Computer 30 also typically receives a number of inputs and outputs for communicating information externally. For interface with a user or operator, computer 30 typically includes one or more user input devices 33, e.g., a keyboard, a mouse, a trackball, a joystick, a touchpad, and/or a microphone, among others, and a display 34 such as a CRT monitor, an LCD display panel, and/or a speaker, among others. It should be appreciated, however, that with some implementations of computer 30, e.g., some server implementations, direct user input and output may not be supported by the computer.

For additional storage, computer 30 may also include one or more mass storage devices 36, e.g., a floppy or other removable disk drive, a hard disk drive, a direct access storage device (DASD), an optical drive, e.g., a CD drive, a DVD drive, etc., and/or a tape drive, among others. Furthermore, computer 30 may include an interface connected to one or more networks 38, e.g., a local-area network, a wide-area network, a wireless network, and/or the Internet, among others, to permit communication of information with other computers coupled to the network. It should be appreciated that computer 30 typically includes suitable analog or digital interfaces between processor 31 and each of the components 32, 33, 34, 36 and 38 as is known in the art.

Computer 30 operates under the control of an operating system 40, and executes various computer software applications, components, programs, objects, modules, etc., such as an executable program 42, a calling stack 44. a debugger 50, among others. The debugger software application 50 is resident in memory 32 for the purpose of debugging one or more executable computer programs, e.g., executable program 42. A calling stack 44 associated with executable program 42 is utilized by operating system 40 during the execution of program 42. These and other various applications components, programs, objects, modules, etc., may also execute on one or more processors in another computer coupled to computer 30 via a network 39, e.g., in a distributed or client-server computing environment whereby the processing required to implement the functions of a computer program may be allocated to multiple computers over a network.

In general, the routines executed to implement the embodiments of the invention whether implemented as part of an operating system or a specific application, component, program, object, module, or sequence of instructions will be referred to herein as computer programs or simply programs. The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention.

While the invention has and hereinafter will be described in the context of fully functioning computers and computer systems, those skilled in the art will appreciate that the various embodiments of the invention are capable of being distributed as a program product in a variety of forms and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks, e.g., CD-ROMs, DVDs, etc., among others, and transmission type media such as digital and analog communication links. In addition, various programs described hereinafter may be based upon the application for which they are implemented in a specific embodiment of the invention. It should be appreciated that any particular program nomenclature that follows is used merely for convenience, and thus the invention should not be limited in its use solely to any specific application identified and/or implied by such nomenclature. The exemplary environments illustrated in FIGS. 1 and 2 are not intended to limit the present invention. Indeed, those skilled in the art will recognize that other alternative hardware and/or software environments may be used without departing from the scope of the invention.

Routines, often referred to as methods, procedures, and functions are typically sequences of instructions or statements in a computer program that may be invoked to perform predetermined operations on a computer. The calling history for a computer program is typically maintained by an operating system using a data structure such as a calling stack that maintains information regarding the sequences of routines that are called during the execution of the computer program.

Flaws, called "bugs," in the program logic or its code may cause programs to respond in ways that are inconsistent from one run to the next, and thus to fail to produce the desired results. Because the reasons for failure are not easily identified, it becomes necessary to examine the program source code, find discrepancies, and resolve them so that the program consistently produces correct results. This process is called debugging. Debugging complex programs is frequently tedious, time-consuming and difficult to do thoroughly. As described below, a method and an apparatus speeds and simplifies the debugging process by identifying discrepancies between one run and another and storing data about these discrepancies, and then allowing users to determine what and where data is gathered about discrepancies. Because it speeds the debugging process, the invention is likely to be used in long loop or multithreaded applications.

An overview of the processes embodying aspects of the invention comprises two modes: a collection mode; and a detection mode. During collection mode, as a debugger or other program embodying features of the invention executes a sequence of instructions or a program, the values of the monitored expressions/variables are stored when the program encounters at least one location, called a collection point, preset/predetermined by the user. At these collection points, the process writes the values of the expressions/variables into a data log without interruption of program execution. Collection mode is preferably established when the program is executing correctly. During detection mode, the program is executed a subsequent time and the same variables/expressions are evaluated at the very same collection points. During detection, the values are retrieved from a previous run and the current values are compared with the previous values; if the values differ significantly, execution of the program is halted, and the user is notified. Similarly, if there is a difference in the order of execution, the values of the variables/expressions will be different and the user is notified.

Figure 3:
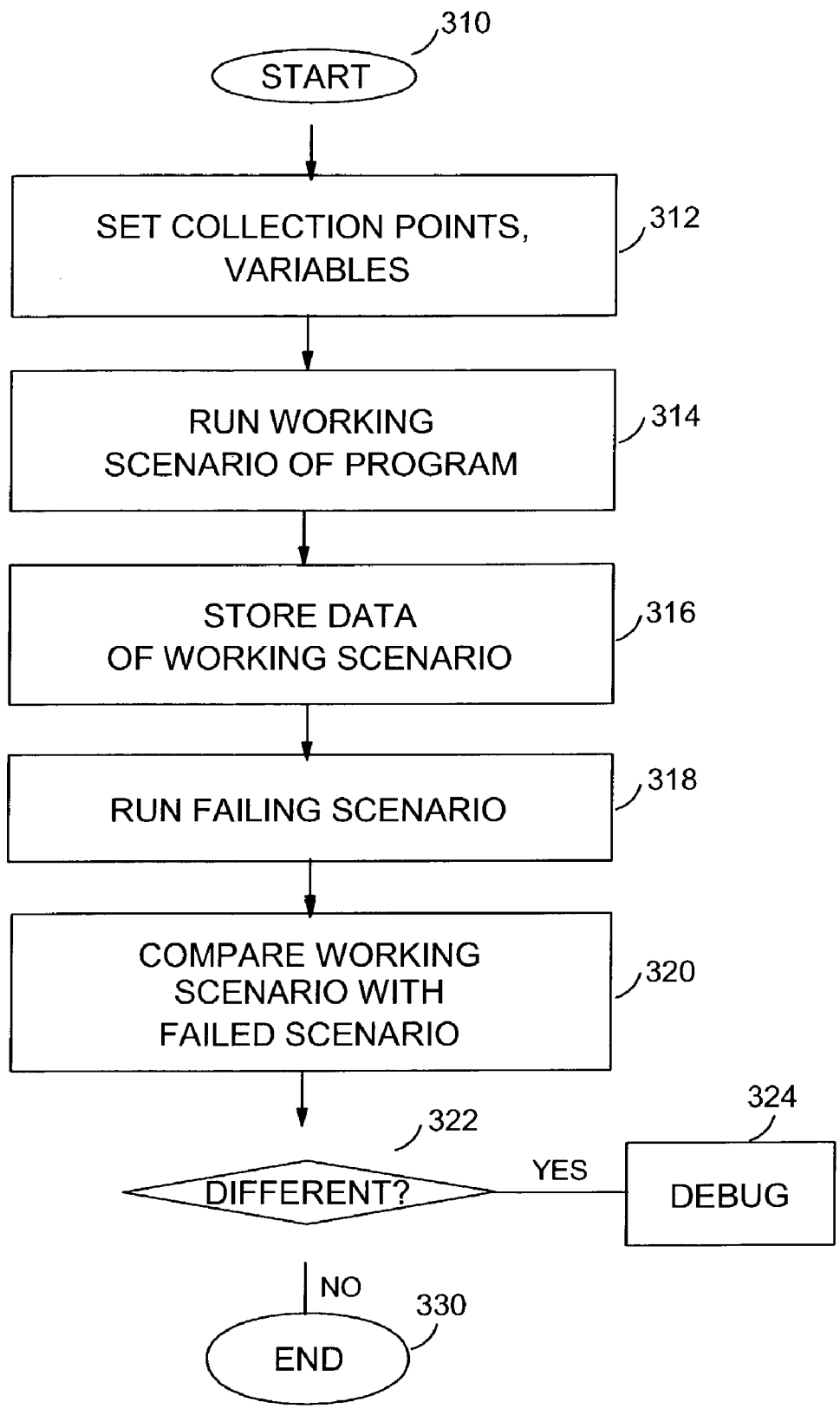
FIG. 3 is a simplified flowchart by which the values of expressions/variables may be collected during one executable run and then compared with values of the same expressions/variables and/or the order of execution may change during a different executable run of the same program in accordance with one aspect of the invention.
Figure 4:
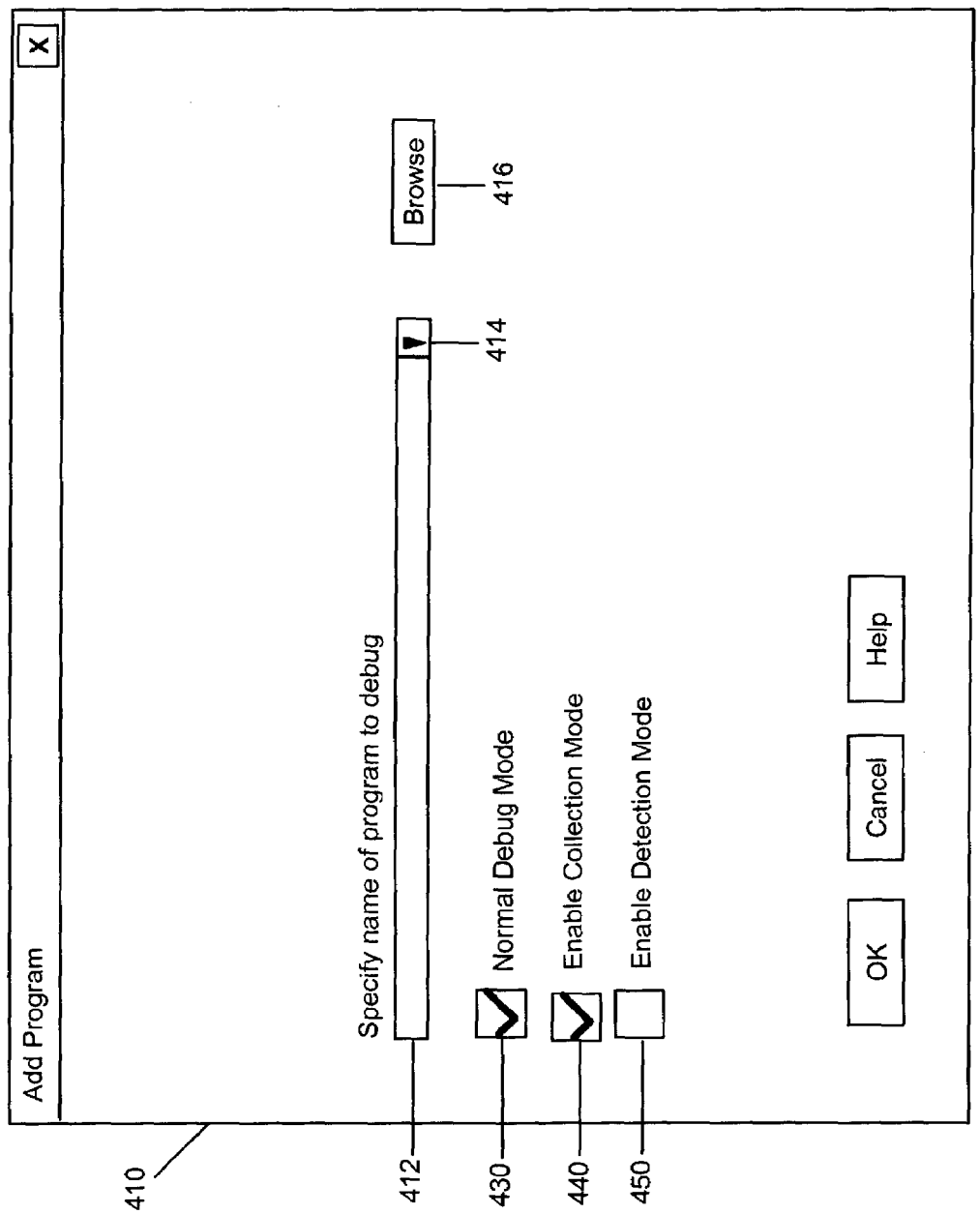
FIG. 4 is an example of a user interface incorporating some features that would be helpful to a user in establishing the process to debug a computer program in accordance with an aspect of the invention.

A broad overview of the process embodied in the invention begins at block 310 in FIG. 3 and a user interface incorporating the features of the graphical user interface of FIG. 4 assists the user to establish or setup the collection mode. Referring back to FIG. 3, at block 312, the user selects the expressions/variables she/he wishes to monitor and further determines the locations of the executing program at which these variables/expressions are to be evaluated. These locations are collection points. In block 314, the program undergoing debugging or evaluation is executed. The variables/expressions are stored in memory, indicated by block 316.

In the detection mode, beginning at block 318, the program undergoing debugging or evaluation is executed a second or subsequent time which fails to produce similar results as execution during the collection mode. During execution of the disparate scenario, the values of the expressions/variables are again collected at the collection points. These values, however, are compared, as in block 320, with the previously-stored values from the scenario when the program was presumed to be correctly executing. In block 322, if the values are significantly different, as will be explained, the detection mode displays the differences, also called discrepancies, execution of the program undergoing debugging is halted, and user may proceed to debug or further evaluate the program tested, as in block 324. If the values of the working scenario are not significantly different from those of the failed scenario, in the detection mode, the program continues to execute until it ends in block 330. An embodiment of this invention is as an automated and advanced component of a debugging program although the invention could also operate independently as stand-alone software.

More detail of the collection mode and the detection mode will now be presented. With respect to FIG. 4, a graphical user interface 410 is presented as an example of a user interface by which a user can select the program to undergo debugging or evaluation and the particular featured mode. Note that the user interface need not be graphical, but may be audio or tactile; it is only that readers may be most familiar with a graphical user interface such as that one displayed in the figure. To begin, the user must select a program to debug. The user may enter the program to be debugged or evaluated in entry field 412 or may select a program from a pull-down menu 414 or by browsing 416 the contents of a hard drive or server and then simply highlighting a program and pressing enter. The user then selects one of three modes: Normal Debug Mode 430, which invokes a debug process; the Enable Collection Mode 440 or Enable Detection Mode 450, both of which constitute entry into the programs embodied in the invention.

Figure 5:
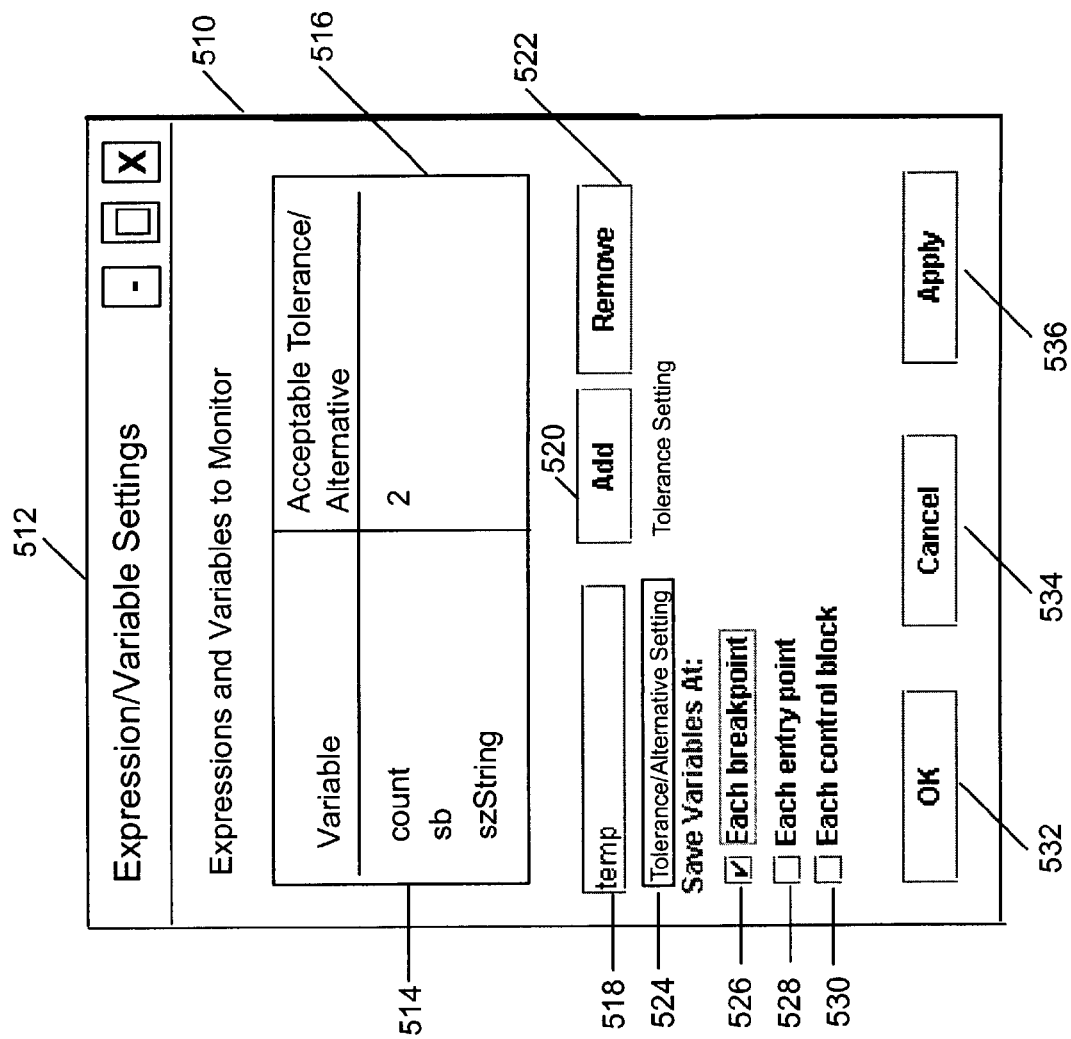
FIG. 5 is an example of a user interface by which a user may setup the collection of expressions/variables during the collection mode of an embodiment of the invention.

FIG. 5 provides an example of a user interface 510 by which the user may select the expressions/variables whose values are to be first stored and then compared in subsequent runs of the computer program. A user interface such as the graphical user interface screen 510 would appear if the user selected Enable Collection Mode 440 in the user interface of FIG. 4. Returning now to FIG. 5, the header 512 entitled "Expression/Variable Settings" describes the function to allow the user to specify the variables/expressions to monitor, as well as tolerances and locations. In this interface 510, the user may type the expression/variable's name into the entry box 518 and select either Add 520 or Remove 522. If added, the expression/variable name appears in the Expression/Variable column 514 of the window above. If removed, the expression/variable would be removed from the list. The user may set an optional tolerance level or an alternative value that defines allowable differences in the values of the specified expression/variable. When the user enters a value into the Tolerance/Alternative Setting box 524, it appears in the Acceptable Tolerance/Alternative column 516 of the window above.

The user then indicates the collection points, i.e., the locations at which the expressions/variables are to be collected. In addition to the regular collection points, the user may request to collect history at "Each breakpoint" 526, "Each entry point" 528, and/or "Each control block" 530. A breakpoint is a precise instruction at which the execution of a program is halted, and may be set by the user through the debug program in which the collection and detection mode may be embedded. It is important to note that there may be locations other than those displayed on the interface 510, such as exit points of a procedure call. The list presented in 526-530 is not intended to be exclusive, rather it is merely an example of how a user may select the collection points at which the values of the expressions/variables are observed and recorded. In this illustration, the user has specified "count" "sb" and "szstring" as expressions/variables, and has indicated that these expressions/variables should be monitored at Each Breakpoint. The user presses OK 532, which saves the settings and causes the Expression/Variable Settings dialogue box to disappear; or the user may press Cancel 534 which cancels all changes or additions to the settings; or the user may Apply 536 which saves the settings but allows the Expression Variable Setting window 510 to remain on the screen.

Figure 6:
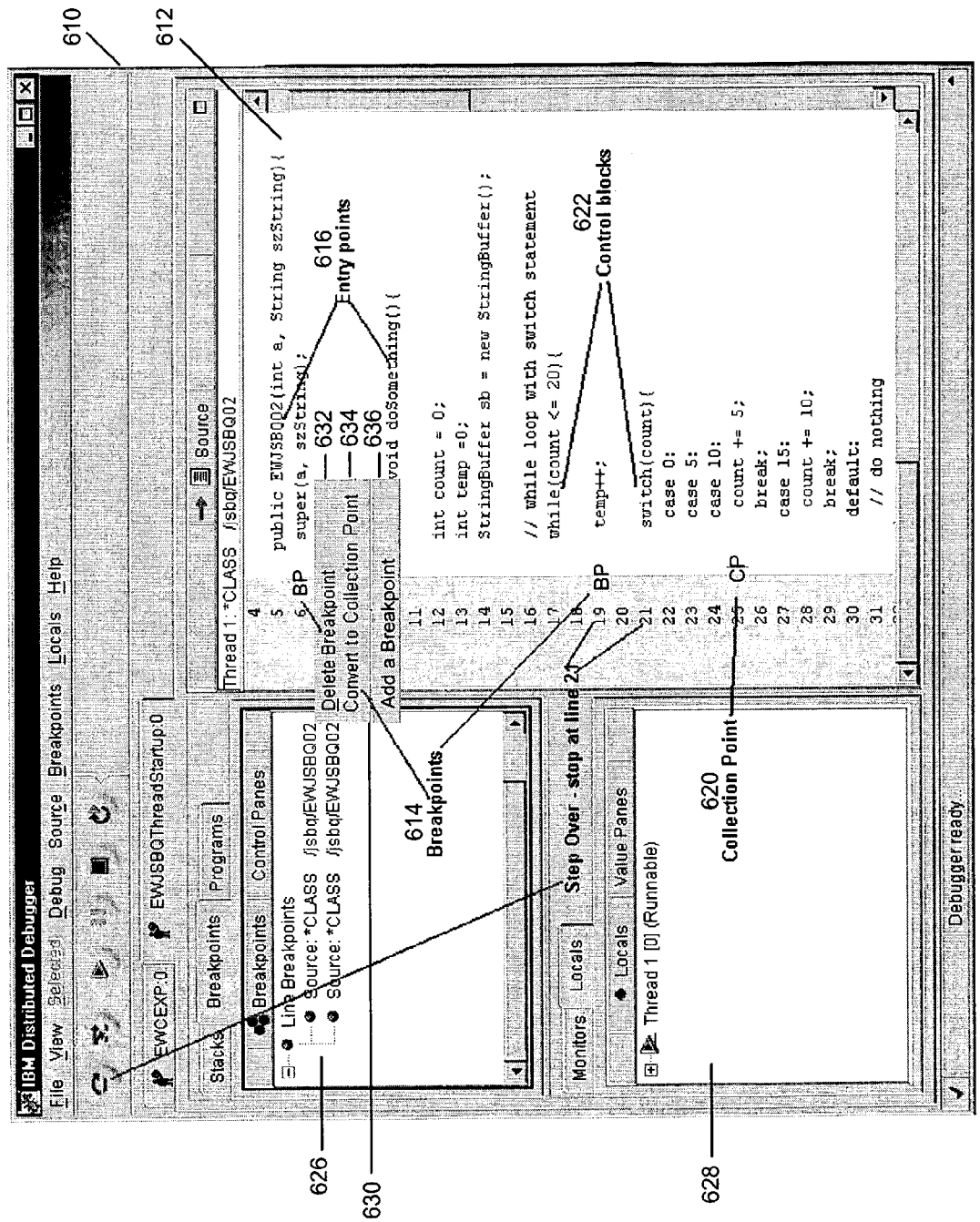
FIG. 6 is an example of yet another user interface in which a user may view the collection points and the breakpoints established in the source code of a program to be debugged or evaluated in accordance with an embodiment of the invention.

FIG. 6 presents a graphical user interface 610 as another example of a user interface that enables a user to set or view collection points. At these breakpoints, also established as collection points, the debugger saves the values of monitored variables and execution of the program will be interrupted in both collection mode and detection mode. Several breakpoints 614 are indicated in the window of code 612 at lines 6 and 19. In this invention, the user also sets collection points 620 or demotes breakpoints to be collection points, using the interface of FIG. 5, at each of which the collection mode saves the values of the monitored expressions/variables and the location at which these values are saved. During collection mode, however, the program does not interrupt execution of the program at the collection points or demoted/converted breakpoints. At those regular breakpoint that are also collection points, but which have not be demoted/converted, however, program execution is not typically interrupted.

In window 612, the user is presented with a code listing in which the breakpoints 614, collection points 620, entry points 616 and control blocks 622 having entry and exit points are marked by abbreviations or other symbols next to code line numbers. As illustrated in window 612, the program being debugged is written in Java programming language but this should not imply that the invention is limited to Java, C++ or other object-oriented languages. The invention also functions with procedural programming languages, such as Report Program Generator (RPG), Cobol and Fortran, as well as with functional programming languages, such as LISP, and other languages.

The user may initiate other functions using a popup menu 630. A user can convert a breakpoint to a collection point by highlighting Convert a Breakpoint to a Collection Point 634. She/he may delete a breakpoint by highlighting Delete Breakpoint 632, or Add a Breakpoint 636. Note that these functions shown in FIG. 6 are merely illustrative; other functions such as adding or deleting collection points, changing lines of code, or adding/deleting control blocks, etc. may be included in the popup menu 630 or other functions accessible to the user in this user interface 610. The window in the upper left 626 shows the location of breakpoints, while the window in the lower left 628 shows the local variables in the routine.

Figure 7:
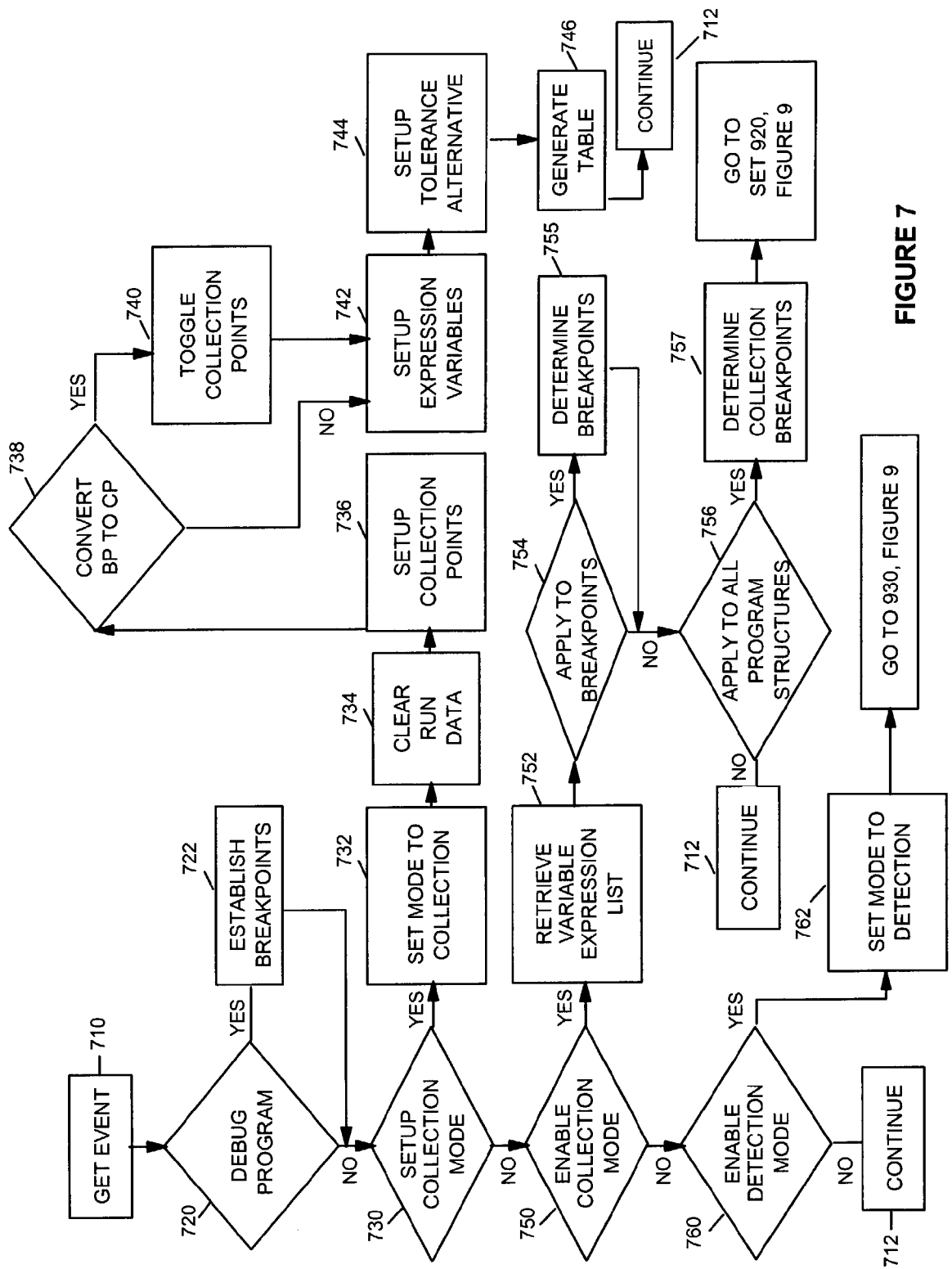
FIG. 7 is a simplified flow chart of the process by which a particular mode may be selected and by which the collection mode may be setup in accordance with features of the invention.

FIG. 7 is a flowchart that describes procedures involved in setting up the collection mode, enabling the collection mode, and enabling the detection mode. To begin, the computer scans for an event 710 such as any keypress, mouse-click or a character input that corresponds to a user or program action. The program identifies the action through the following decision points which may be accomplished in parallel or sequentially: if the event is to Add a Program to Debug as in block 720, the user initially sets breakpoints 722 and continues to block 730.

The program continues to identify the event and asks if the user wishes to setup or modify the collection mode, as in block 730. If yes, the program sets the mode to collection mode in block 732 and any previously stored run data in memory are cleared, as in block 734, before the user either sets up or modifies any collection points as in block 736. If the user desires to convert any breakpoints to collection points, she/he may do so as in block 738, using, for example, the user interface as described with respect to FIGS. 5 and 6. The breakpoint flag will toggle to indicate that the breakpoint has been converted to a collection point, as in block 740, and if toggled, execution will not stop during the collection mode. The user then establishes the expression/variable whose values are to be stored at the collection points, as in block 742. If the user is willing to accept a range or alternative values of the expressions/variables, these may be set in block 744 and these expressions/variables, collection points, breakpoints, and other modifications are then added to a collection and breakpoint table generated in block 746 and as shown in FIG. 8a and program continues as in block 712. FIG. 8a is a simplified representation of a table of collection points and breakpoints that specifies the location and the nature of the collection point, such as whether the collection point is a breakpoint or an entry point, etc. Also presented in FIG. 8a are the expressions/variables to be collected and the acceptable range and/or alternative values for each expression/variable.

If the event is neither to add a program to debug 720 nor to setup/modify the collection mode 730, the program continues to identify the event and queries if the user wants to enable the collection mode in block 750. If yes, the collection mode retrieves the expression/variable list from memory as in block 752 and determines in blocks 754 and 756 if it should collect the values of the expressions/variables at collection points, selected breakpoints, at other points in various program structures such as entry and exit points of control blocks, loops, program calls, and other points within the various program structures. If yes, collection mode proceeds to step 920 of FIG. 9.

The user, however, may wish to execute the program again and this time, collect data and detect differences in the values of the expressions/variables which might also indicate a change in the order of execution, as in block 760, as in the detection mode. The mode is set to detection at block 762 and process jumps to block 930 of FIG. 9. FIG. 8b is an example of how the run data might be stored each time a program undergoing debugging is executed. FIG. 8b adds an additional column onto FIG. 8a illustrating the variables/expressions and the actual values. Note that between statement 95 and 111 and again between statement 111 and 132, the expressions/variables B and C vary considerably which might be an indication for further debugging or evaluation of the program. Such tables such as in FIGS. 8a and 8b could appear in user interfaces accessible to the user. Certainly, the detection mode and the user interface could be modified to exhibit a history of multiple executions to determine if the values exhibit random or some deterministic behaviour.

Figure 9:
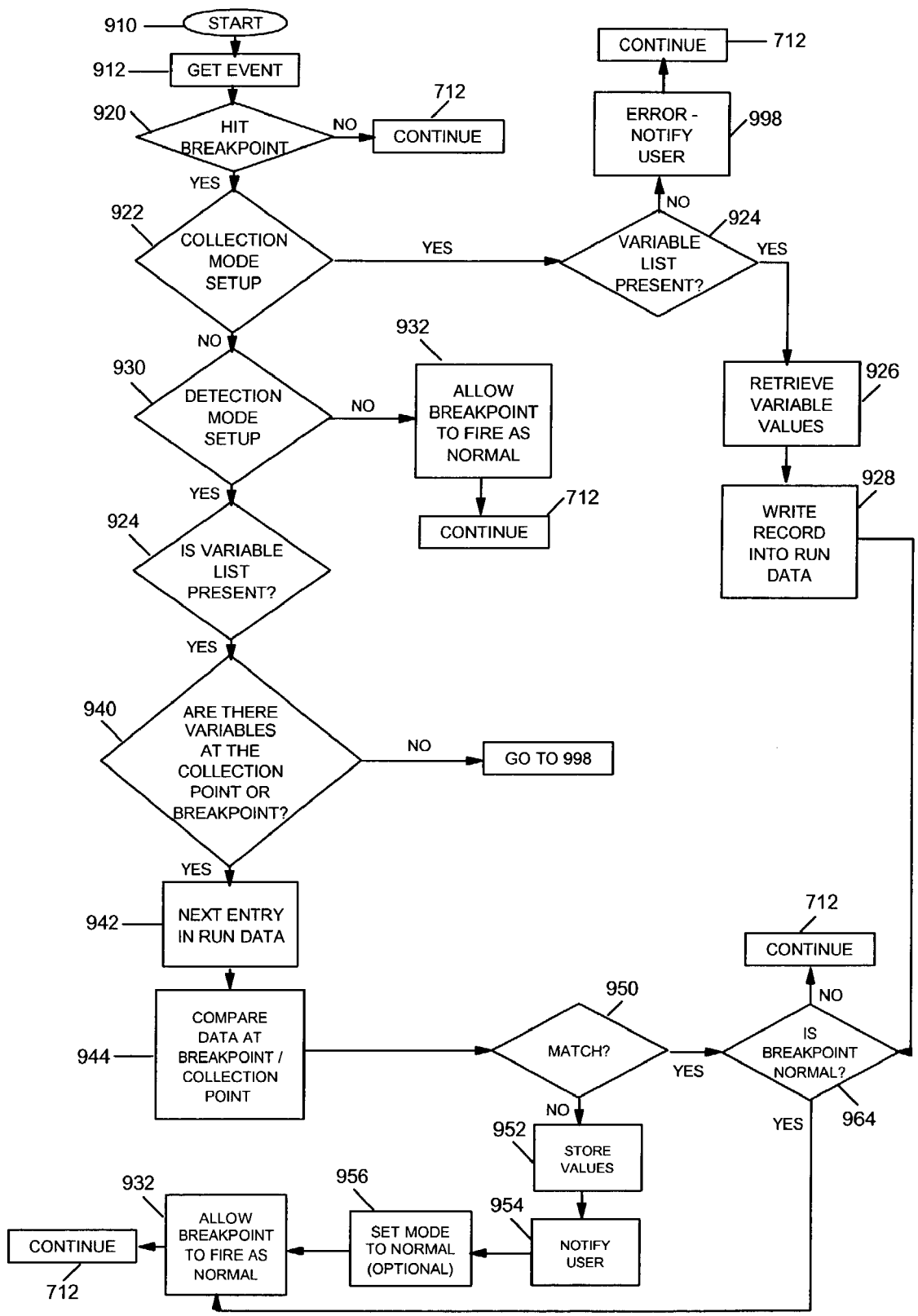
FIG. 9 is a simplified flow chart of the process by which a collection mode and a detection mode may be established in an embodiment of the invention.

FIG. 9 is a simplified flowchart that illustrates the essential procedures of the collection mode and the detection mode. After the collection mode or detection mode is invoked at step 910, such as by enabling the collection and/or detection mode as described with respect to FIG. 4, the mode scans for an event 912 and identifies it through a series of decision points. At this time the program undergoing debugging and/or evaluation is executing. The first inquiry is whether the program being debugged has encountered a breakpoint or a collection point, as in block 920. If yes, the mode inquires if the collection mode has been set up and is active, as in block 922. If yes, the mode requests the expression/variable list from memory 924 and retrieves it at 926. If, however, the variable list is not present, as in block 924, an error is flagged and the user is notified, as in block 998.

As the debugged program executes, the values of the expressions/variables found at this breakpoint or collection point are stored, as in block 928. The mode inquires at block 964 if the flag associated with the breakpoint or collection point was a regular breakpoint. If so, the mode fires the breakpoint as normal, as in block 932, execution is halted, and the mode continues as in block 712. If the breakpoint was converted to a collection point, data is collected and stored but execution of the program is not interrupted.

If, after hitting a breakpoint and/or a collection point at block 920 and if the collection mode was not setup as in block 922, the mode continues to block 930 to determine if the user wishes to execute the debugging program in the detection mode. If yes, the mode now switches to detection mode and the detection mode now searches for the expression/variable table of FIG. 8a in memory as in block 924. If the table is present, the mode scans it to determine if there are expressions/variables to be evaluated at this breakpoint and/or collection point, as in block 940. If so, then in block 942, the mode stores the actual value of the run data in memory as in FIG. 8b. At this time, the detection mode compares the retrieved values of the expressions/variables, such as in Table 8a, with the actual run values of the expressions/variables at the same collection point, as in block 944. If there is a match, meaning that the values of the actual run are the same or within an acceptable range or an acceptable alternative value of the retrieved values, as evaluated in block 950, then the mode inquires if the collection point is a normal breakpoint, as in block 964, and the breakpoint fires as normal, as in block 932 and the process continues as in block 712.

Figure 10:
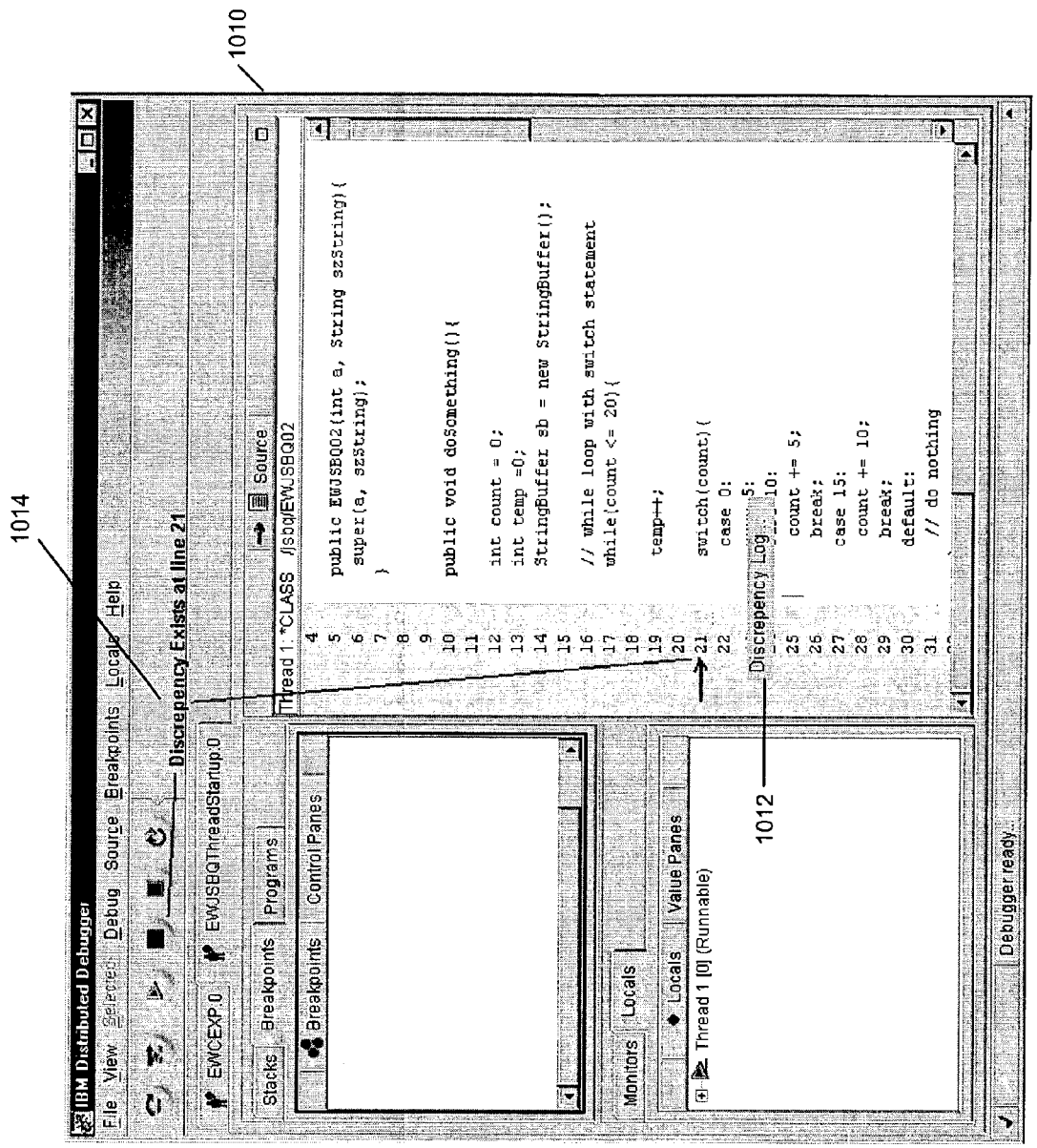
FIG. 10 is an example of a graphical user interface in which a user may view the source code of the program undergoing debugging and in particular, the location of a discrepancy occurring after the detection mode was executed.

If, however, the actual run values are not acceptable within the tolerance or the alternative values are not allowed, the actual run values are stored as in block 952 and as shown in FIG. 8b, execution of the program is interrupted, and the user is notified. The user may invoke a user interface such as illustrated in FIG. 10, illustrating details of the discrepancy, shown in block 954. An optional step at block 956, set the mode to normal debug mode.

Figure 11:
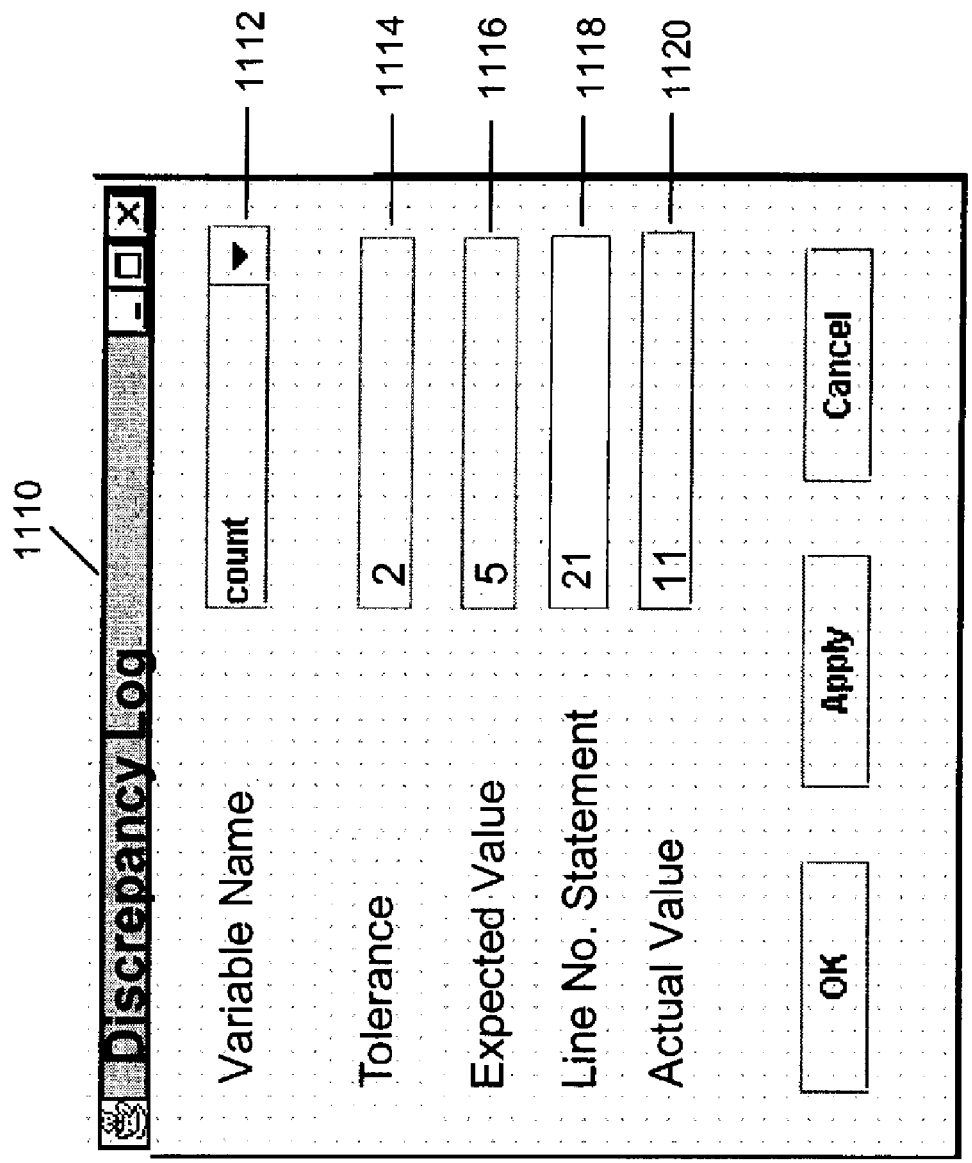
FIG. 11 is an example of a user interface in which the user may view the details of the discrepancy of an expression/variable that was recorded in the detection mode as a feature of the invention.

FIG. 10 is an example of a user interface 1010 illustrating that a discrepancy 1014 has been detected at line 21. A popup menu 1012 allows view of discrepancy log, such as in FIG. 11, which may be invoked for each expression/variable. The discrepancy log 1110 contains details of the differences encountered while the debugging program was executing in the detection mode. The variable/expression name 1112 is a pulldown menu of all variables/expressions at the breakpoint that fired or the collection point. The user may also view the tolerance range or the acceptable alternative values, as in 1114. The expected value of the expression/variable shown in 1116 is that set by the user during collection mode, and the actual run value 1118 and the statement location 1120 obtained during detection mode may be displayed. In one embodiment, it may be possible to change the tolerance settings 1114 by entering a new value. The settings are accepted by entering Apply or OK.

Thus, advantageously, a user who writes and debug computer programs is able to detect differences between program runs. The user is able to intentionally select the expressions/variables and the collection points at which the expressions/variables are evaluated. She/he need no longer step through hundreds of lines of code to find a bug; rather by using the several embodiments of the invention as described herein, the bug will find the user.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

The embodiments of the invention in which an exclusive property or privilege is claimed are defined as follows:

1. A debugging method, comprising:
    specifying at least one expression in a computer program to be debugged;
    establishing at least one collection point in the computer program;
    storing the expression in an expression table;
    executing the computer program in a collection mode, wherein executing the computer program in the collection mode comprises performing a first execution of the computer program without interruption of program execution at the at least one collection point, and
storing a first execution value of the at least one expression at the at least one collection point;
executing the computer program in a detection mode, wherein executing the computer program in the detection mode comprises
performing a second execution of the computer program,
determining a second execution value of the at least one expression at the at least one collection point,
storing the first execution value and the second execution value in the expression table;
comparing the first execution value and the second execution value;
conditionally interrupting the second execution of the computer program in response to a comparison of the first execution value and the second execution value, wherein conditionally interrupting the second execution of the computer program comprises
halting the second execution of the computer program at the at least one collection point in response to a determination that the second execution value and the first execution value differ;
generating from the expression table a history of values of the expression and orders of execution at the at least one collection point along with expected values of the expression, wherein the history of values of the expression comprise the first and second execution values; and
displaying the expression table, the at least one collection point, and source code of the computer program.

2. The debugging method of claim 1, further comprising: detecting that an order of execution differs between the first execution and the second execution.

3. The debugging method of claim 1, further comprising: setting an acceptable range of the first execution value; and wherein the determination that the second execution value and differs the first execution value differ comprises detecting if the second execution value is outside the acceptable range of the first execution value.

4. The debugging method of claim 1, further comprising: establishing the at least one collection point at a breakpoint in the computer program.

5. The debugging method of claim 4, further comprising: converting the breakpoint to the at least once collection point.

6. The debugging method of claim 1, further comprising: establishing the at least one collection point at least one of an entry point and an exit point of a program structure.

7. The debugging method of claim 6, wherein the program structure is a control block.

8. The debugging method of claim 6, wherein the program structure is a procedure call.

9. The debugging method of claim 6, wherein the program structure is a loop.

10. The debugging method of claim 6, further comprising: establishing at least one additional collection point between the entry point and the exit point of the program structure.

11. The debugging method of claim 1, further comprising: modifying at least one of a placement and number of the at least one collection point.

12. The debugging method of claim 1, further comprising: modifying at least one of the at least one expression and a number of the at least one expression to detect if the second execution value is outside an acceptable range of the first execution value.

13. The debugging method of claim 1, wherein the debugging method is a machine implemented process in a computer debugging program.

14. The debugging method of claim 1, wherein the debugging method is included in an object level trace program.

15. A debugging method comprising:
specifying an expression in a computer program;
storing the expression in an expression table;
establishing a collection point in the computer program;
executing the computer program a first time without interruption of program execution at the collection point;
storing in the expression table a first execution value of the expression at the collection point during the first execution;
executing the computer program a second time;
storing in the expression table a second execution value of the expression at the collection point during the second execution;
detecting that the second execution value is outside an acceptable range of the first execution value wherein the detecting comprises
comparing the second execution value and the first execution value;
modifying at least one of a placement and number of the collection point;
modifying at least one of the expression, number and, acceptable range of the expression;
generating from the expression table a history of values of the expression and orders of execution at the collection point along with expected values of the expression, wherein the history of values of the expression comprise the first and second execution values; and
displaying the expression table, the collection point, and source code of the computer program.

16. The debugging method of claim 15, further comprising:
detecting that an order of execution during the second execution is different than an order of execution during the first execution.

17. A method of tracing a value of an expression in consecutive executions of a computer program, said method comprising:
receiving input specifying the computer program in which the expression is to be traced;
receiving input specifying the expression to be traced;
storing the expression in an expression table;
receiving input specifying at least one of an acceptable range of a value and an alternative value of the expression to be traced;
receiving input specifying a number of collections points at which the value of the expression is stored, wherein at least one collection point is set by a user;
performing a first execution of the computer program;
storing in the expression table first execution values of the expression at the number of collection points during the first execution;
performing a second execution of the computer program;
storing in the expression table subsequent execution values of the expression at the number of collection points during the second execution;
determining that the subsequent execution values are at least one of: outside the acceptable range of the value and not an alternative value of the expression wherein the determining comprises comparing the subsequent execution values and the first execution values;
generating from the expression table a history of values of the expression and orders of execution at the number of collection points along with expected values of the expression, wherein the history of values of the expression comprise the first execution values and the subsequent execution values;

displaying the expression table, the number of collection points, and source code of the computer program; and notifying a debug program of a determination that the subsequent execution values are at least one of: outside the acceptable range of the value and not the alternative value of the expression.

18. The method of claim 17, further comprising:
detecting that an order of execution of the second execution is different than an order of execution of the first execution.

19. The method of claim 17, further comprising:
allowing a user to change at least one of the expression, the acceptable range, and the alternative value of the expression.

20. The method of claim 17, further comprising:
allowing a user to change at least one of the number of and location of the collection points.

21. A processing device to trace an expression, said processing device comprising:
a processor;
a memory functionally connected to the processor;
a first computer program in which the expression is active, the first computer program having at least one collection point selected by a user at which a value of the expression is evaluated;
a collection mode element to store the value of the expression at the at least one collection point within the memory during a first execution of the first computer program wherein the first execution is performed without interruption of program execution of the first computer program at the at least one collection point;
a detection mode element to determine whether the value of the expression and an order of execution at the at least one collection point differ during subsequent executions of the first computer program and to generate a history of values of the expression and orders of execution at the at least one collection point;
an expression table stored in the memory to store the expression, expected values, and actual values of the expression at the at least one collection point;
a display unit to display the expression table, the at least one collection point, and source code of the first computer program to a user; and
an input device to receive input to modify the expression and the at least one collection point in the first computer program from the user.

22. An article of manufacture, comprising a data storage medium tangibly embodying a program of machine readable instructions executable by an electronic processing apparatus to perform debugging operations comprising:
specifying at least one expression in a computer program to be debugged;
establishing at least one collection point in the computer program;
storing the expression in an expression table;
executing the computer program in a collection mode, wherein executing the computer program in the collection mode comprises
performing a first execution of the computer program without interruption of program execution at the at least one collection point, and
storing in the expression table a first execution value of the at least one expression at the at least one collection point;
executing the computer program in a detection mode, wherein executing the computer program in the detection mode comprises
performing a second execution of the computer program,
determining a second execution value of the at least one expression at the at least one collection point,
storing the second execution value in the expression table;
comparing the first execution value and the second execution value;
conditionally interrupting the second execution of the computer program in response to a comparison of the first execution value and the second execution value, wherein conditionally interrupting the second execution of the computer program comprises
halting the second execution of the computer program at the at least one collection point in response to a determination that the second execution value and the first execution value differ;
generating from the expression table a history of values of the expression and orders of execution at the at least one collection point along with expected values of the expression, wherein the history of values of the expression comprise the first and second execution values; and
displaying the expression table, the at least one collection point, and source code of the computer program.

* * * * *